(12) United States Patent
Bossek et al.

(10) Patent No.: US 11,544,074 B2
(45) Date of Patent: Jan. 3, 2023

(54) METHOD AND DEVICE FOR CONFIGURING A HARDWARE COMPONENT

(71) Applicant: Phoenix Contact GmbH & Co. KG, Blomberg (DE)

(72) Inventors: Bjoern Bossek, Bad Pyrmont (DE); Carsten Gregorius, Bad Pyrmont (DE); Lutz Rahlves, Tündern (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 702 days.

(21) Appl. No.: 16/455,240

(22) Filed: Jun. 27, 2019

(65) Prior Publication Data
US 2020/0004555 A1  Jan. 2, 2020

(30) Foreign Application Priority Data
Jun. 27, 2018  (BE) .................................. 2018/5447

(51) Int. Cl.
*G06F 8/34* (2018.01)
*G06F 9/4401* (2018.01)
(Continued)

(52) U.S. Cl.
CPC ........ *G06F 9/4411* (2013.01); *G05B 19/0426* (2013.01); *G06F 3/0486* (2013.01);
(Continued)

(58) Field of Classification Search
CPC .. G06F 9/4411; G06F 3/04847; G06F 3/0486; G06F 8/34; G05B 19/0426; G05B 2219/23258
See application file for complete search history.

(56) References Cited

U.S. PATENT DOCUMENTS 5,301,301 A * 4/1994 Kodosky ................. G06F 30/20
                                                        700/86
5,909,368 A    6/1999 Nixon et al.
(Continued)

FOREIGN PATENT DOCUMENTS

DE    102004020994 A1   11/2005
EP        2098926 A1    9/2009
EP        2260357 A1   12/2010

OTHER PUBLICATIONS

Search Report and Written Opinion issued in counterpart Belgian patent application No. 2018/5447, dated Mar. 6, 2019, 21 pp.
(Continued)

*Primary Examiner* — Gary Collins
(74) *Attorney, Agent, or Firm* — Kaplan Breyer Schwarz, LLP

(57) ABSTRACT

A method and a device for configuring a hardware component, in particular of a configurable safe input/output module, includes using a configuration program that is designed to display a graphical user interface on a display apparatus that is connected to a data processing system, which user interface provides function blocks having inputs and outputs. By way of the method and the device, two function blocks can be interconnected so as to form a combined function block having at least one input and one output, at least one of the inputs or outputs of the first function block and at least one of the inputs or outputs of the second function block forming at least two of the inputs/outputs of the combined function block.

13 Claims, 2 Drawing Sheets

(51) Int. Cl.
*G06F 3/04847* (2022.01)
*G06F 3/0486* (2013.01)
*G05B 19/042* (2006.01)

(52) U.S. Cl.
CPC ............ *G06F 3/04847* (2013.01); *G06F 8/34* (2013.01); *G05B 2219/23258* (2013.01)

(56) References Cited

U.S. PATENT DOCUMENTS

| | | | | |
|---|---|---|---|---|
| 6,282,699 | B1* | 8/2001 | Zhang | G06F 8/34 717/109 |
| 2006/0290716 | A1 | 12/2006 | Gunji et al. | |
| 2009/0327942 | A1* | 12/2009 | Eldridge | G06F 30/30 715/771 |
| 2010/0153910 | A1* | 6/2010 | Ciolfi | G06F 8/34 717/105 |
| 2011/0098830 | A1* | 4/2011 | Weddingfeld | G05B 19/0426 700/79 |
| 2011/0215896 | A1* | 9/2011 | Bornstein | G05B 19/0426 340/4.3 |
| 2011/0230983 | A1* | 9/2011 | Koepcke | G05B 19/0426 700/86 |
| 2012/0029661 | A1* | 2/2012 | Jones | G06F 3/0484 700/17 |
| 2012/0197417 | A1* | 8/2012 | Horn | G05B 19/0426 700/81 |
| 2017/0185470 | A1* | 6/2017 | Höfig | G06F 11/2252 |

OTHER PUBLICATIONS

Office Action issued in counterpart German patent application No. 102018115431.3, dated Dec. 14, 2018, 19 pp.
Khoral Research, Inc., "The Khoros Visual Programming Environment, Chapter 1 and Appendix A", XP002293306, Dec. 20, 1994, 106 pp., URL:ftp://ftp.tnt.uni-hannover.de/pub/soft/khoros2/manual/khoros_manual/.
National Instruments: "LabView User Manual—Apr. 2003 Edition", XP002453188, 349 pp., URL:http://www.ni.com/pdf/manuals/3209993pdf.

* cited by examiner

METHOD AND DEVICE FOR CONFIGURING A HARDWARE COMPONENT

RELATED APPLICATIONS

This application claims the priority benefit of Belgian patent application number 2018/5447, filed Jun. 27, 2018, the entire disclosure of which is incorporated herein by reference.

FIELD

The invention relates to a method and to a device for configuring a hardware component, in particular of a configurable safe input/output module having at least one module input for module input signals and/or at least one module output for module output signals, in order to connect at least one function module.

BACKGROUND

As automated processes become more widespread and increasingly complex, the importance of avoiding and coping with errors using safety apparatuses and functions, in particular those that are certified with regard to safety standards, has also increased. Safe and likewise configurable input/output modules are used in automation engineering in particular when safety logic is intended to be provided, which can be flexibly adapted to the respective requirements of the system. In this case, it is known to configure or adapt the desired safety logic for a configurable safety module using a configuration program that is executed on a data processing system. In this way, safety controllers can be individually installed or configured in order to reliably integrate functional safety into the automation.

European patent EP 2 098 926 A1 describes a method for programming and/or configuring a safety controller that comprises a controller and at least one connection module, which comprises at least one input for a sensor and/or at least one output for an actuator, functional units, i.e. sensors and/or actuators, which are to be connected to the safety controller being selected by means of a graphical user interface, and being associated inputs and/or outputs of a connection module. In this case, functional units to be connected are automatically associated suitable inputs and/or outputs by means of an association function.

European patent EP 2 260 357 B1 relates to a device for controlling a system and to a method for setting up and handling control of a system. In particular, a control unit is provided, which is designed to process a control program of the system, the control program comprising function modules that are used to actuate actuators of the system and to evaluate sensors of the system and to exchange data with at least one additional communication peer of the system. A visualization unit is also provided, which is used to functionally display the control program to an operator, each function module of the control program being represented in the functional display of the control program by a display module. Activated display modules each form part of the functional display of the control program and can be used to display the status of and define the parameters for the respective function modules during the runtime of the control program.

SUMMARY

One object of the present invention is to improve the configuration process for a configurable hardware component, in particular of a safe input/output module. More particularly, additional possibilities for carrying out more complex configurations having a plurality of function blocks are intended to be given. One aspect of the object is to simplify and speed up configuration of the safety logic, to reduce programming effort, to increase the reliability of the validation and to therefore ultimately improve the safety of automation processes.

This object is achieved by the subject matter of the independent claims. Advantageous embodiments form the subject matter of the dependent claims.

According to the invention, a method is provided for configuring a configurable hardware module or a configurable hardware component, in particular of a safety module or a safety component. The method in particular relates to the configuration of an automation component that is intended for the field level and preferably meets specific safety standards, for example has a specific safety integrity level (SIL), for example at least level 1, at least level 2, at least level 3 or even level 4.

In particular, the configurable hardware can be an input/output module having at least one module input for module input signals and/or at least one module output for module output signals, in order to connect at least one function module, a safe input/output module having safe inputs and safe outputs preferably being used. Sensors or actuators, for example, can be used as function modules.

In order to configure the hardware component, a piece of configuration software is used, i.e. a configuration program, which can be executed on a data processing system and is designed to display a graphical user interface on a display apparatus that is connected to the data processing system. The configuration program preferably corresponds to legal specifications with regard to setting up safety applications, and/or is designed to implement the requirements of standard ISO 13849-1, in particular according to the version that is valid on the filing date. "SAFECONF" can be named as an example of such a configuration program.

In this case, the graphical user interface provides a plurality of function blocks that each have at least one input for input signals and one output for output signals, and allows each of the function components to be selected by means of the graphical user interface in order to use them to configure the hardware component. For this purpose, the safe components/functions are integrated in the graphical programming interface of the configuration software, for example, in order to provide a specific safety function when establishing safety logic. The function blocks that are provided and/or selected by means of the graphical user interface each have an equivalent in the hardware component, for example, on which control logic is provided that comprises the corresponding function blocks. The function blocks provided can be collated in a library, for example. In order to activate a function block on the hardware component to be configured or to integrate it in the control logic, the corresponding function block can be selected, for example by means of the graphical user interface, or said block can also optionally be activated after being selected. In particular, a selected or activated function block can be used by means of the graphical user interface to define the parameters of and/or to connect to other function blocks such that the behavior of the function block(s) in the hardware component can be influenced. The function blocks each provide a specific independent function, which acts on the input signals in order to generate the output signals, it being possible for the function blocks to each be executed or activated independently.

According to the invention, in the method for configuring a hardware module a first and a second function block are interconnected so as to form a combined function block having at least one input for input signals and one output for output signals such that at least one of the inputs or outputs of the first function block and at least one of the inputs or outputs of the second function block form at least two of the inputs and outputs of the combined function block. The wording "one of the inputs" or "one of the outputs" is understood here and in the following to mean "one of the at least one input" or "one of the at least one output" provided that at least one input or at least one output is provided. Accordingly, the wording "two of the inputs and outputs" is understood to mean "two inputs/outputs of the at least one input and output". In other words, the combined function block of both the first and the second function block comprises one input or output in each case. In particular, for these corresponding inputs/outputs, the input/output signals of the combined function block correspond to those of the first/second function block. The combined function block therefore in particular comprises both functions of the first and second function block and can in particular be independently integrated in the control logic of the hardware component or activated therein, it being possible for this to be implemented in the hardware component by connection, selection or activation, for example. The combined function block can, for example, in turn be used by means of the graphical user interface to define the parameters of and/or to connect to other function blocks.

In a development, at least three or a plurality of function blocks can also be interconnected, each of these function blocks to be combined contributing at least one input or one output in the combined function block in each case.

When the first and the second function block are connected, the combined function block is preferably formed such that at least one of the inputs of the first function block and at least one of the inputs of the second function block form at least two inputs of the combined function block. All the inputs, in particular data inputs, of the first function block and all the inputs, in particular data inputs, of the second function block can also be provided in the combined function block. Activation inputs can optionally be composed of a single activation input.

Furthermore, when the first and the second function block are connected, the combined function block is preferably formed such that the output signals of at least one of the outputs of the first function block and the output signals of at least one of the outputs of the second function block influence the output signals of at least one output of the combined function block. The output signals of all the (data) outputs of the first function block and all the (data) outputs of the second function block may also influence the output signals of at least one output of the combined function block.

In particular, a logical connective between the output signals of at least one of the outputs of the first function block and the output signals of at least one of the outputs of the second function block can form the output signals of at least one output of the combined function block. This logical connective is provided in the hardware component in particular by the connective, the selection or the activation of the combined function block. In this case, the logical connective can in particular be a Boolean operator, i.e. in particular an AND operator, an OR operator, an XOR operator, a NOT operator, a NAND operator, a NOR operator or an XNOR operator.

The logical connective is preferably selected from a group of logical connectives by means of the graphical user interface and/or is modified, i.e. the method step of selecting and modifying the logical connective is also included. In particular, a Boolean operator is selected and/or modified, i.e. in particular one of the following operators: an AND operator, an OR operator, an XOR operator, a NOT operator, a NAND operator, a NOR operator or an XNOR operator.

The first and/or the second function block is/are preferably selected by means of the graphical user interface in order to use it/them to configure the hardware component before the first and second function blocks are interconnected so as to form the combined function block. In another embodiment of the invention, however, the first and/or second function block can also be interconnected so as to form the combined function block before the combined function block is selected by means of the graphical user interface.

The first and/or second function block or of the combined function block is/are preferably selected by means of the graphical user interface by dragging and dropping, in particular by means of a display apparatus or gesture recognition apparatus that is connected to the data processing system and/or the display apparatus. Said blocks can also already be selected by being dragged.

The first and/or second function block is/are preferably displayed on the graphical user interface as an independent planar region before, during and/or after being selected, and the at least one input for input signals and/or output for output signals is/are preferably displayed as a graphic object in the planar region such that the hardware component can be configured by means of the graphical user interface such that the input signals and/or output signals and the module input signals of the module input and/or the module output signals of the module output are interdependent.

In a preferred embodiment of the method, the first function block is selected by means of the graphical user interface by dragging and dropping in order to use it to configure the hardware component, the first function block being displayed on the graphical user interface as a first planar region, at least after it has been dropped. The second function block is then selected by means of the graphical user interface by dragging and dropping in order to use it to configure the hardware component, the second function block being displayed on the graphical user interface as a second planar region, at least while it is being dragged. In this case, the second planar region of the second function block is made to overlap with the first planar region of the first function block in order to interconnect the two function blocks so as to form the combined function block, and in particular this connection is/can also be established in the hardware component. The connection can be provided when said regions overlap or as a result of said blocks being dropped, for example.

However, in another embodiment, the first and the second function block can also each be selected by means of the graphical user interface, in particular by means of dragging and dropping, the corresponding functions in particular already being provided or providable in the hardware component and the connection then being established so as to form the combined function block, and in particular this connection is in turn established or establishable in the hardware component. In this case, the connection can in turn be established by (subsequently) bringing about an overlap or by carrying out a logical connective command, for example.

In particular, the combined function block is displayed on the graphical user interface as an independent planar region before, during and/or after being selected and the at least one input for input signals, output for output signals and/or Boolean operator for the logical connective are preferably displayed as a graphic object in the planar region such that the hardware component can be configured by means of the graphical user interface such that the input signals and/or output signals and the module input signals of the module input and/or the module output signals of the module output are interdependent, which interdependence includes the Boolean operator.

In a development, the method involves establishing a connection between at least one of the module inputs and/or at least one of the module outputs and at least one of the inputs or outputs of the combined function block by means of the graphical user interface in order to configure the hardware component such that the respective module input signals and/or module output signals are treated as the respective input signals and/or output signals of the combined function block.

With regard to all the embodiments, the first, second and/or the combined function block each represent a function, in particular a safety function, such that the output signals of at least one of the outputs of the particular function block correspond to a function of the input signals of at least one of the inputs of the particular function block in order to implement the particular function by means of the hardware component, and the function preferably being certified by a testing organization with regard to a safety requirement and preferably meeting a preset safety integrity level (SIL), for example at least level 1, at least level 2, at least level 3 or even level 4.

The invention also relates to a device for configuring a hardware component, in particular of a configurable input/output module having at least one module input for module input signals and/or at least one module output for module output signals, in order to connect at least one function module.

The device comprises a data processing system and a display apparatus connected thereto, which are designed to execute a configuration program in order to configure the hardware component and to display a graphical user interface of the configuration program. Furthermore, the device can comprise the hardware component. The graphical user interface provides a plurality of function blocks that each have at least one input for input signals and one output for output signals, the function blocks each being selectable by means of the graphical user interface in order to use them to configure the hardware component.

The device according to the invention, the data processing system and/or the display apparatus connected thereto are designed to interconnect a first and a second function block so as to form a combined function block having at least one input for input signals and one output for output signals such that at least one of the inputs or outputs of the first function block and at least one of the inputs or outputs of the second function block form at least one of the inputs and one of the outputs of the combined function block. The additional design options for the method also apply to the device.

The invention also relates to a configuration program for configuring a hardware component, in particular of a configurable input/output module having at least one module input for module input signals and/or at least one module output for module output signals, in order to connect at least one function module. The configuration program can be executed on a data processing system and is designed to display a graphical user interface on a display apparatus that is connected to the data processing system, the graphical user interface in turn providing a plurality of function blocks that each have at least one input for input signals and one output for output signals, and the function blocks each being selectable by means of the graphical user interface in order to use them to configure the hardware component.

The configuration program according to the invention comprises commands that prompt or can prompt the data processing system and/or the display apparatus connected thereto to interconnect a first and a second function block so as to form a combined function block having at least one input for input signals and one output for output signals such that at least one of the inputs or outputs of the first function block and at least one of the inputs or outputs of the second function block form at least one of the inputs and one of the outputs of the combined function block. The additional design options for the method also apply to the configuration program.

Lastly, the invention also relates to a storage medium, which comprises a configuration program stored thereon, for configuring a hardware component, in particular of a configurable input/output module having at least one module input for module input signals and/or at least one module output for module output signals, in order to connect at least one function module.

A configuration program is stored on the storage medium according to the invention, which program can be executed on a data processing system and is designed to display a graphical user interface on a display apparatus that is connected to the data processing system, the graphical user interface providing a plurality of function blocks that each have at least one input for input signals and one output for output signals, and the function blocks each being selectable by means of the graphical user interface in order to use them to configure the hardware component.

The configuration program stored on the storage medium according to the invention comprises commands that prompt the data processing system and/or the display apparatus connected thereto to interconnect a first and a second function block so as to form a combined function block having at least one input for input signals and one output for output signals such that at least one of the inputs or outputs of the first function block and at least one of the inputs or outputs of the second function block form at least one of the inputs and one of the outputs of the combined function block. The additional design options for the method also apply to the storage medium.

BRIEF DESCRIPTION OF THE DRAWINGS

Additional embodiments of the invention will be explained in more detail with reference to the accompanying drawings, in which.

DETAILED DESCRIPTION

Figure 1:
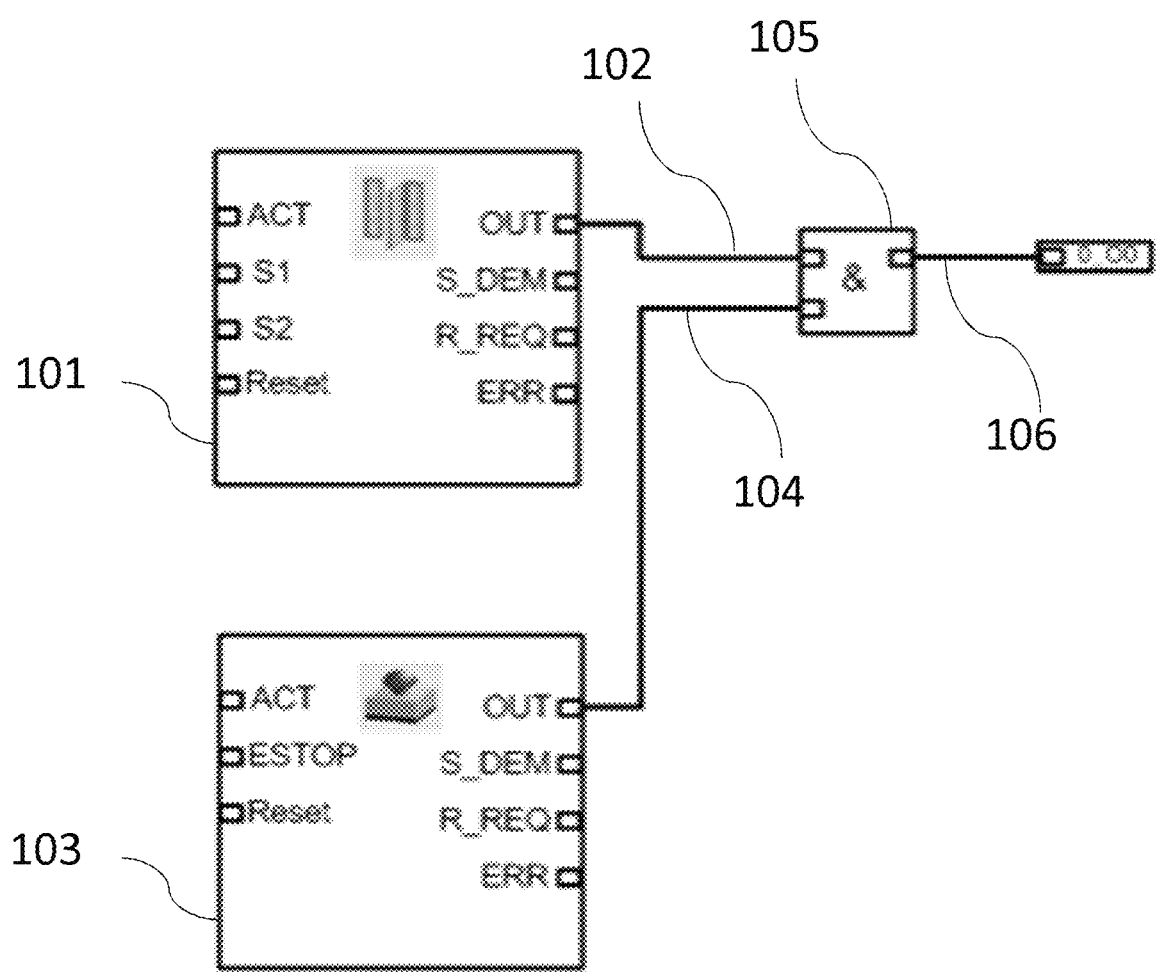
FIG. 1 shows part of a graphical user interface having two function blocks, the outputs of which are interconnected by means of an AND operator, FIG. 2a) shows part of a graphical user interface comprising a first function block that is selected, FIG. 2b) shows part of a graphical user interface comprising the first function block that is selected in FIG. 2a) and a second function block, the planar display regions of the second and first function block being made to overlap one another in order to bring about a logical connective, and FIG. 2c) shows part of a graphical user interface comprising a combined function block that is formed by combining the first and second function blocks from FIG. 2b).

FIG. 1 shows a safe function block 101, which provides a monitoring function (guard monitoring), for example, and a safe function block 103, which provides an emergency stop function, for example. The safe components/functions are integrated in the graphical programming interface of the configuration software, for example, in order to provide a specific safety function when establishing safety logic. The function blocks are each independently selectable/activatable and provide an independent function in the hardware component, i.e. the hardware module.

If a plurality of safety functions, for example different emergency stop buttons, are intended to be processed, according to the prior art it is known to use a separate function block for each individual safety function. Following this, the output parameters can then be connected by a logical "AND" connective. In FIG. 1, this is shown by means of the Boolean AND operator 105, which connects the output signals 102, 104 of the outputs OUT of the two function blocks 101 and 103 and provides them as output signal 106 (0_O0). The Boolean operator only provides a logical connective and therefore cannot be understood as a function block.

For safety logic having two or more independent function blocks, the outputs of which are interconnected by means of Boolean operators after having been selected, a multiple configuration of the hardware module can be produced, for example in the event of configuration by means of selection or interconnection. Furthermore, on account of the logical connective, program networks that are difficult to read (to interpret) can occasionally be produced. In the safety region in particular, easy readability is, however, a prerequisite for the validation of safety functions.

Figure 2A:
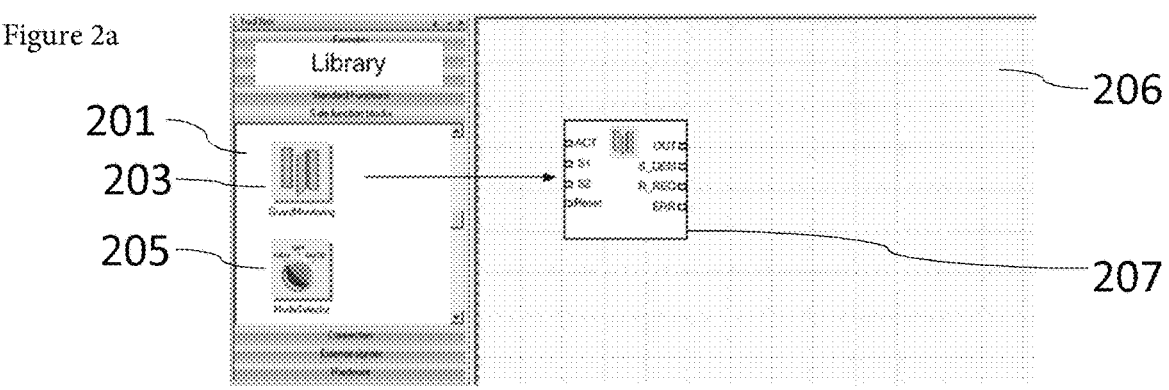

FIG. 2*a*) shows a region of the graphical user interface that is formed as a block library 201 and in which a plurality of function blocks are displayed as a graphic representation 203, 205. A particular function block 207 can be selected from the plurality of function blocks that are provided by the configuration program or the graphical user interface, which blocks have a graphic representation 203, 205 in the block library 201, by means of dragging and dropping in order to use said function block to configure the hardware component. A selected function block 207 can, for example, be displayed in an editing region 206 (graphic editor) of the graphical user interface. The hardware component can be configured in particular together with the selection of the function block 207 such that said block in the hardware component is activated and/or transferred from the configuration program to the hardware component, or the hardware component may then be configured and/or activated.

In this example, the function block 207 is displayed as an independent planar region on the graphical user interface in particular while it is being dragged and after it is dropped, inputs S_1, S_2, etc. for input signals and outputs OUT, etc. for output signals being displayed as graphic objects in the planar region.

Figure 2B:
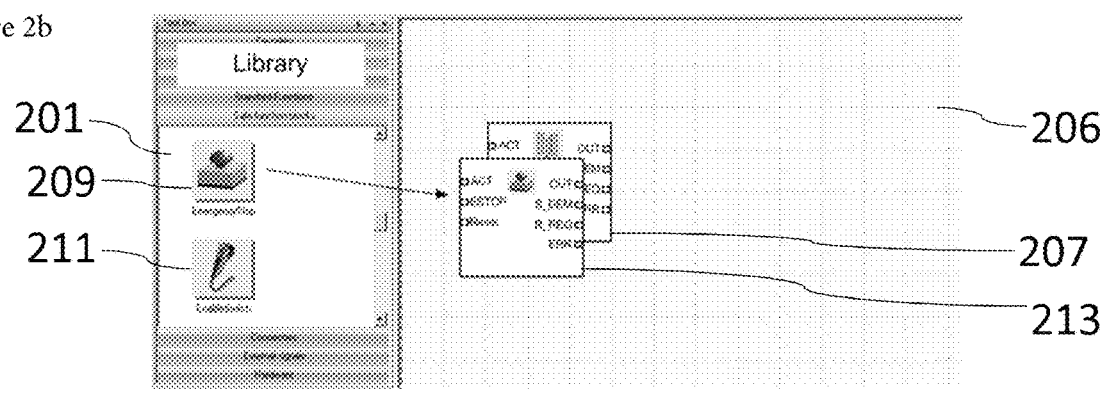

FIG. 2*b*) in turn shows the block library 201 and the graphical editing region 206. The selected function block 207, which can be used to configure the hardware component, is shown in the editing region 206 and thus allows the inputs/outputs shown to be connected to inputs/outputs of other function blocks or to module inputs/module outputs.

By means of dragging and selecting, another function block 213 can be selected, whereby a graphic representation 209 of the function block in the block library 201 is dragged and dropped in the graphical editing region 206. As it is dragged, the additional function block 213 is displayed on the graphical user interface as an independent planar region, inputs ESTOP, etc. for input signals and outputs OUT, etc. for output signals being displayed in the planar region as graphic objects. The planar region of the additional function block 213 is made to overlap with the planar region of the function block 207 already selected; said additional function block is then dropped order to interconnect the two function blocks and to produce a combined function block for configuring the hardware component.

Figure 2C:
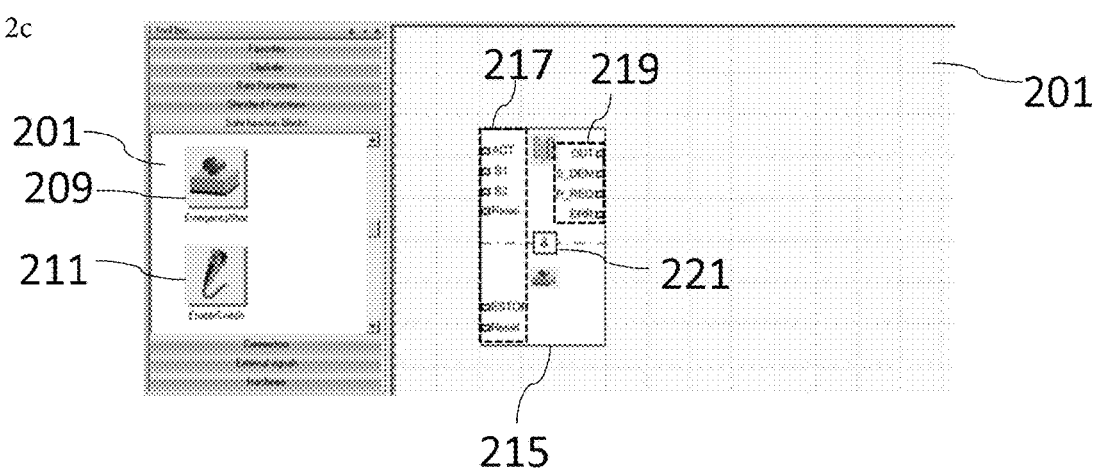

FIG. 2*c*) in turn shows the block library 201 and the graphical editing region 206. By means of the graphical user interface, the two function blocks 207 and 213 were interconnected so as to form a combined function block 215. The combined function block 215 is displayed by a planar region, an input region 217 comprising inputs S_1, S_2, etc. being provided and an output region 219 comprising the output OUT, etc. being provided. The output region 219 comprises a region having outputs for safe output parameters and another region for outputs comprising diagnostic messages.

The combined function block 215, which is used to configure the hardware component, comprises the inputs S_1, S_2, etc. of the function block 207 and the inputs ESTOP etc. of the additional function block 213. Furthermore, the combined function block comprises a combined output OUT, the output signals of which are influenced by the output signals of the two outputs OUT of the two function blocks 207 and 213, for example by a logical operator 221 being used. In this case, the output signal of the combined block is formed by the logical AND connective of the two output signals of the function blocks 207 and 213. For example, during the connecting process, the combined function block can provide an AND connective in order to be used to configure the hardware component by means of said AND connective.

In other words, the following method steps are carried out by means of the configuration program, for example. Firstly: any block/function is dragged from the block library and dropped in the programming interface (graphical editor). Secondly: for an additional safety function, a required block/function is once again dragged from the block library and dropped on the block that was the first to be placed down in the graphical editor. As a result, the first block/function is automatically combined (docked) with the second block/function. Furthermore, the rest of the input and output parameters are automatically adapted. The combined blocks/functions now jointly control a common safe output parameter (see the example) on the basis of the selected logical function (AND, OR, NOT, etc.). This can in particular be directly implemented in the hardware component, for example in a safety module, such that the multiple configuration of the hardware module is reduced in the event of configuration by means of selection or interconnection, for example.

Additional advantages include the fact that the memory load of the hardware can be reduced. For example, the load on the hardware component and/or the data processing system can be reduced. Furthermore, logically interconnected function blocks are also displayed more simply and a simple extension of additional safety functions is therefore also possible. By combining safe blocks/functions, a simpler and more transparent display of the safety program is also achieved and is thereby easier to understand, control and validate, which is especially important for safety systems. An additional advantage is that fewer functions and connecting lines are required in the programming interface. Lastly, time and costs can be saved as a result of less programming effort.

In summary, FIG. 2*a*) to *c*) accordingly show that any safe blocks/functions can be combined and expanded, for example by being dragged and dropped from a block library in a graphic programming interface. The combined safe blocks/functions act on just one safe output parameter (logical connective result), for example. Safe and non-safe input and output parameters, for example for diagnosis, and block/function parameters can be shown and/or collated in an optimum manner. Between the combined blocks/functions, it is, for example, possible to control the safe output parameters on the basis of the component/function evaluation by means of a selection field (parameter window) having logical functions (AND, OR, NOT, etc.). Safe function blocks can in particular therefore be combined or expanded in a graphical user interface any number of times and in particular act on just one safe output parameter or on a safe output signal.

The invention claimed is:

1. A method for configuring a hardware component comprising a configurable safe input/output module having at least one module input for module input signals and/or at least one module output for module output signals, in order to connect at least one function module, comprising:
using a configuration program to configure the hardware component, which program can be executed on a data processing system and is designed to display a graphical user interface on a display apparatus that is connected to the data processing system,
providing, with the graphical user interface a plurality of function blocks that each provides a specific function and have at least one input for input signals and one output for output signals, and wherein each of the function blocks can be selected by means of the graphical user interface in order to use them to configure the hardware component,
interconnecting a first function block of the plurality of function blocks and a second function block of the plurality of function blocks so as to form a combined function block comprising both functions of the first function block and the second function block and having at least one input for input signals and one output for output signals such that at least one of the inputs or outputs of the first function block and at least one of the inputs or outputs of the second function block form at least two of the inputs/outputs of the combined function block, wherein the first function block and/or the second function block are each displayed/is displayed as an independent planar region in an editing region of the graphical user interface, and wherein the combined function block is displayed as another independent planar region in the editing region of the graphical user interface, wherein in the another independent planar region of the combined function block the at least two inputs/outputs of the combined function block are displayed as a graphic object.

2. The method according to claim 1, wherein, when the first function block and the second function block are connected, the combined function block is formed such that at least one of the inputs of the first function block and at least one of the inputs of the second function block form at least two inputs of the combined function block.

3. The method according to claim 1, wherein, when the first function block and the second function block are connected, the combined function block is formed such that the output signals of at least one of the outputs of the first function block and the output signals of at least one of the outputs of the second function block influence the output signals of at least one output of the combined function block.

4. The method according to claim 3, wherein a logical connective between the output signals of at least one of the outputs of the first function block and the output signals of at least one of the outputs of the second function block forms the output signals of at least one output of the combined function block, wherein the logical connective is a Boolean operator comprising an AND operator, an OR operator, an XOR operator, a NOT operator, a NAND operator, a NOR operator or an XNOR operator.

5. The method according to claim 4, wherein the Boolean operator comprising the AND operator, the OR operator, the XOR operator, the NOT operator, the NAND operator, the NOR operator or the XNOR operator is selected by means of the graphical user interface and/or is modified.

6. The method according to claim 1, wherein the first function block and/or the second function block is/are selected by means of the graphical user interface in order to use it/them to configure the hardware component before the first and second function blocks are interconnected so as to form the combined function block.

7. The method according to claim 6, wherein the first function block and/or the second function block is/are selected by means of the graphical user interface by dragging and dropping, by means of a display apparatus or gesture recognition apparatus that is connected to the data processing system and/or display apparatus.

8. The method according to claim 1, wherein the first function block and/or the second function block are each displayed/is displayed on the graphical user interface as the independent planar region before, during and/or after being selected, and the at least one input for input signals and/or output for output signals are each displayed/is displayed as a graphic object in the independent planar region such that the hardware component can be configured by means of the graphical user interface such that the input signals and/or output signals and the module input signals of the module input and/or the module output signals of the module output are interdependent.

9. The method according to claim 8, wherein the first function block is selected by means of the graphical user interface by dragging and dropping in order to use it to configure the hardware component, wherein the first function block is displayed on the graphical user interface as the independent planar region, at least after it has been dropped, and
wherein the second function block is then selected by means of the graphical user interface by dragging and dropping in order to use it to configure the hardware component, wherein the second function block is displayed on the graphical user interface as the independent planar region, at least while it is being dragged, and
wherein the independent planar region of the second function block is made to overlap with the independent planar region of the first function block in order to interconnect the two function blocks so as to form the combined function block.

10. The method according to claim 1, wherein the combined function block is displayed on the graphical user interface as the another independent planar region and the at least one input for input signals, output for output signals and/or a Boolean operator for the logical connective are displayed as a graphic object in the another independent planar region such that the hardware component can be configured by means of the graphical user interface such that the input signals and/or output signals and the module input signals of the module input and/or the module output signals of the module output are interdependent, which interdependence includes the Boolean operator.

11. The method according to claim 1, including establishing a connection between at least one of the module inputs and/or at least one of the module outputs and at least one of the inputs or outputs of the combined function block by means of the graphical user interface in order to configure the hardware component such that the respective module input signals and/or module output signals are treated as the respective input signals and/or output signals of the combined function block.

12. The method according to claim 1, wherein the first function block, the second function block and/or the combined function block each represent a function comprising a safety function, such that the output signals of at least one of the outputs of the first function block, the second function block and/or the combined function block correspond to a function of the input signals of at least one of the inputs of the first function block, the second function block and/or the combined function block in order to implement the function by means of the hardware component, and wherein the function is certified by a testing organization with regard to a safety requirement and meets a preset safety integrity level.

13. A device for configuring a hardware component comprising a configurable input/output module having at least one module input for module input signals and/or at least one module output for module output signals, in order to connect at least one function module, comprising:

a data processing system and a display apparatus connected thereto, which are designed to execute a configuration program in order to configure the hardware component and to display a graphical user interface of the configuration program, wherein the graphical user interface provides a plurality of function blocks that each provides a specific function and have at least one input for input signals and one output for output signals, and wherein each of the function blocks can be selected by means of the graphical user interface in order to use them to configure the hardware component, and wherein the data processing system and/or the display apparatus connected thereto are designed to interconnect a first function block of the plurality of function blocks and a second function block of the plurality of function blocks so as to form a combined function block comprising both functions of the first function block and the second function block and having at least one input for input signals and one output for output signals such that at least one of the inputs or outputs of the first function block and at least one of the inputs or outputs of the second function block form at least two of the inputs/outputs of the combined function block, wherein the first function block and/or the second function block are each displayed/is displayed as an independent planar region in an editing region of the graphical user interface, and wherein the combined function block is displayed as another independent planar region in the editing region of the graphical user interface, wherein in the another independent planar region of the combined function block the at least two inputs/outputs of the combined function block are displayed as a graphic object.

* * * * *